United States Patent [19]
Johnson

[11] 3,822,933
[45] July 9, 1974

[54] LEVEL CONTROL
[75] Inventor: J. Wallace Johnson, New Caney, Tex.
[73] Assignee: Liquid Level Lectronics, Inc., Houston, Tex.
[22] Filed: Oct. 10, 1972
[21] Appl. No.: 295,924

[52] U.S. Cl. .................................................. 251/65
[51] Int. Cl. ........................................... F16k 31/08
[58] Field of Search ........................ 137/412; 251/65

[56] References Cited
UNITED STATES PATENTS
1,894,367 1/1933 Corcoran .......................... 251/65 X
2,626,594 1/1953 Kimmell .......................... 137/412 X
2,842,150 7/1958 Olson ............................... 251/65 X
3,090,849 5/1963 Coulin ............................ 137/412 X Primary Examiner—Edgar W. Geoghegan
Assistant Examiner—H. Burks
Attorney, Agent, or Firm—Robert W. B. Dickerson

[57] ABSTRACT

A liquid-level control, utilizing a magnet-containing float lever arm to control the fluid input to or output from a vessel.

7 Claims, 2 Drawing Figures

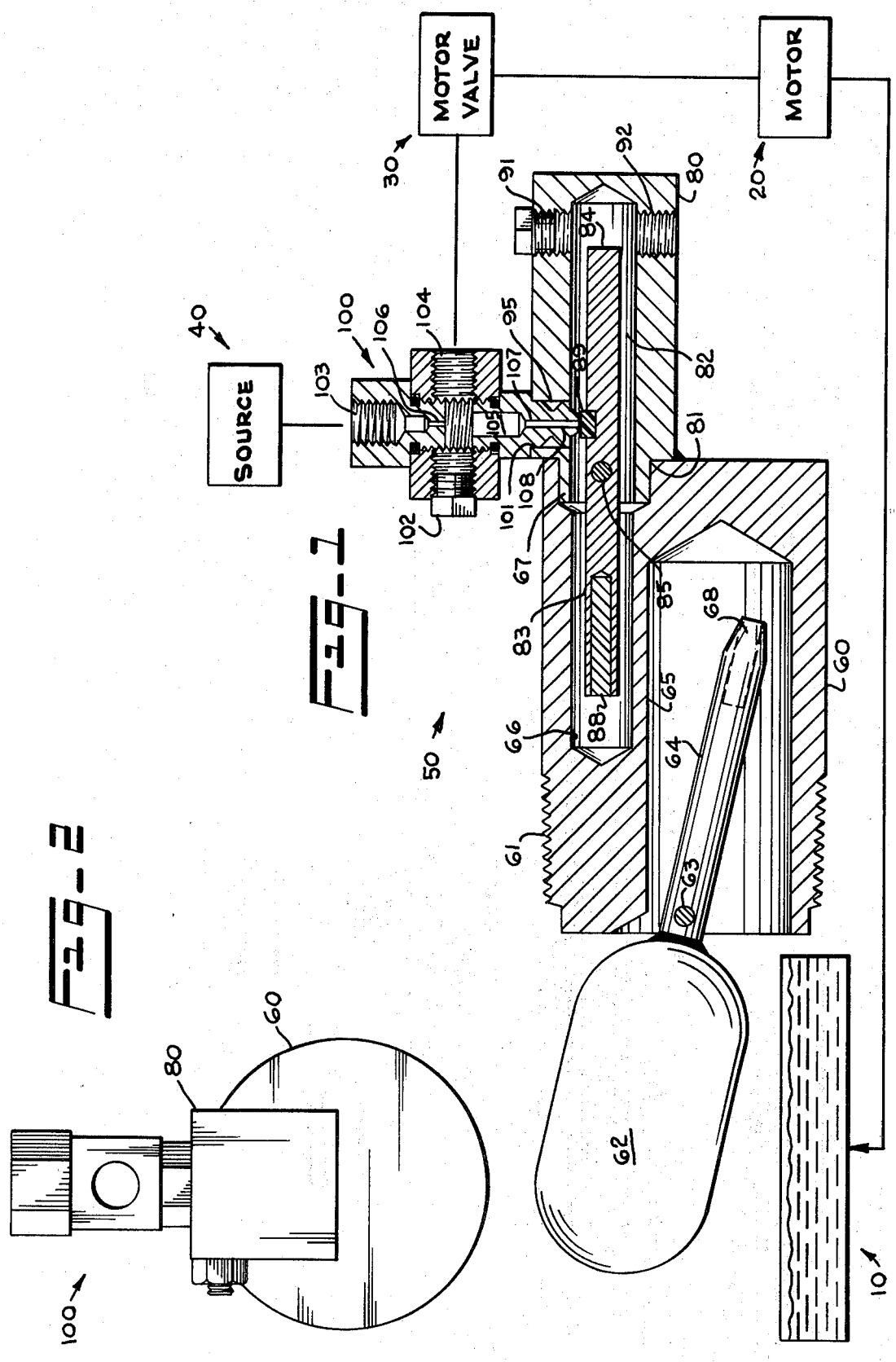

LEVEL CONTROL

BACKGROUND OF THE INVENTION

Control mechanisms have long been used to not only determine the level of material within a vessel or container, but also to regulate the supply of such material to or from the vessel. Such controls, when related to fluid material, have, in many instances, used floats as an integral part of the control. With respect to such float-containing controls, certain difficulties have arisen. In some prior art devices, seals, that may cause leakage or friction, have been required to bar fluid passage to or from the vessel interior. Delicate regulation was difficult. Also, the controls have oftentimes been rather bulky. It was to such difficulties as these that this invention was addressed.

SUMMARY OF THE INVENTION

A float comprises one arm of a lever, and is pivotally attached to a housing. A further arm, opposite to the float, includes a magnet. A separate lever, also pivoted to the housing, incurs motion as a function of the float-lever magnet position. Such movement, in conjunction with a regulatable nozzle opening, controls the operation of a motor, pump, or other driving force which in turn governs the supply of material to or from the vessel within which the float is positioned.

DESCRIPTION OF THE DRAWINGS

FIG. 1 is a partly schematic, axial section through the control; and

FIG. 2 is an end view of the control.

DESCRIPTION OF A PREFERRED EMBODIMENT

FIG. 1 indicates schematically the existance of a material containing vessel 10, a motor 20, or similar driving machanism, as a power supply necessary to provide material as needed to or from the vessel, a valve 30 which may use pneumatic or hydraulic means to control operation of the motor, a source 40 of such pneumatic or hydraulic fluid to operate the valve, and a level control 50 which control comprises the invention herein. The term fluid, as related to source 40 may refer to gaseous or liquid material.

Consider now the details of the float control mechanism 50. A housing includes a float section 60 and a pilot section 80. Looking first at the float section, it is generally cylindrical in configuration, and includes a threaded portion 61 for engagement with a threaded counterpart (not specifically shown) provided the wall of vessel 10. A float 62 comprises one arm of a lever, which lever is pivoted at 63 to the wall of section 60, and said lever also includes an oppositely disposed arm 64. The arm 64 and pivot are seen to be mounted within an axially extended cavity or aperture 65 of housing section 60. Spaced from cavity 65, and generally parallel thereto, housing section 60 includes a rocker arm cavity 66. Fitted within enlarged end or counterbore 81 of cavity 66, is lug extension 67 of pilot section 80. Section 80 of housing 50 also has an axial cavity 82 which is aligned with and communicates with cavity 66. A pilot rocker or lever has arms 83 and 84 and is pivoted to the wall of pilot cavity 82, at pivot 85. Pilot lever arm 83 is shown to extend within cavity 66. Both float lever arm 64 and rocker arm 83 are shown to have magnets, 68 and 88 respectively, imbedded within or fixed to them. Also, rocker arm 84 has gasket 89 fitted thereon or positioned within a recess therein for a purpose hereinafter described. Bores, which may be threaded, 91 and 92, extend through walls of pilot housing section 80. While bore 91 is shown to be plugged, it may be linked to instrumentation or other members. Aperture 92 leads to exhaust. A further tap or bore 95 extends through the wall of pilot section 80, and communicates with cavity 82. Through this opening 95, passes nipple extension 101 of pilot body 100.

The pilot body provides communication between the source 40 of pressurized hydraulic or pneumatic fluid and the valve, and thereby controls motor operation through appropriate and known valving and/or switch mechanisms. Three openings, which may be threaded 102, 103 and 104 in the pilot body may provide communication between a central axial cavity 105 and the exterior of the body 100. As shown in the drawings, aperture 102 is plugged, 103 connects to the source 40, and 104 leads to the valve. Communication between bore 103 and central cavity 105, occurs through reduced diameter passageway 106. Further, to complete an axial opening through body 100, an internal conduit 107 joins one end of cavity 105 with the opening 109 through teat 108 of nipple extension 101.

The operation of the level control is as follows. When the liquid within vessel 10 is at a sufficiently high level, float 62 will ride approximately as shown in FIG. 1, with lever arm 64 inclined downwardly. Fluid from source 40 would be entering opening 103, continuing through passageway 106, into cavity 105, downwardly through conduit 107, into cavity 82, to be exhausted through port 92. At this stage, this would be the path of least resistance. The force necessary to open valve 30 is greater than that necessary to exit through conduit 107, against the force of gasket 89, in the absence of a required force interaction between magnets 68 and 88. As the fluid level within vessel 10 drops, float 62 will drop with it, thus raising arm 64 and its magnet 68. The presence of this arm not only carries the magnet, but also performs as a counter weight and thus permits use of a smaller float than normally might be required. As arm 64 rises, the force of attraction between the two magnets increases, i.e., as a function of the distance therebetween. At this point it should be stated that:

1. except for the two magnets as shown, the remainder of the control mechanism would normally be fabricated of non-magnetic material, and 2. if desired, a single magnet could be placed in one of the levers and the other fabricated of a magnetically attracted material, such as steel. Continuing the explanation, as the magnetic force increases, the pilot lever tends to pivot about point 85 in a counter clockwise direction. This tends to force gasket 89 against the opening of conduit 107. If the force caused by the magnets is sufficient, such opening will tend to be closed and fluid from source 40 will course through port 104 to the valve as a function of this force. Thus, there is a throttling action, providing a variable output. Sufficient adjustment is permitted by the following controlled variables of 1) the pressure from the source 40, 2) the float lever arm length and pivot positions, 3) the magnetic force of attraction, 4) the pilot lever arm length and pivot positions, and 5) size of opening of aperture 107 into cavity 82. These variables permit operation so that with a given source perssure, material may be supplied to or removed from vessel 10 as a continuing function of the position of the float 62. It should be noted that as the magnetic force increases, gasket 89 tends to block the lower opening of aperture 107. As the flow of the source fluid decreases through such aperture, it obviously builds up through port 104, to the motor control. Various types of control mechanisms are available, i.e., 1) on the pressure reaching a certain level the motor would become operative, or 2) motor operation would operate on a continuous basis with varying motor speed and thereby material provided or withdrawn as a function of the force build up. But such motor control mechanisms, indicated only generally by numeral 30, do not form, as such, the invention herein.

It would obviously be possible to rotate the control mechanism of FIG. 1 by 180 degrees whereby raising of the fluid level within a vessel would increase the magnetic attraction between the levers. Such operation is obviously within the intended scope of this invention.

Although only a single embodiment has been described, it should be apparent that numerous modifications would be possible by one skilled in the art without departing from the spirit of the invention, the scope of which is intended to be limited only by the following appended claims.

I claim:

1. In a liquid level control having a motor device for providing said liquid to a vessel and a source of pressurized fluid for controlling operations of said motor, the improvement comprising:
    a housing;
    a float mounted on a first lever, said first lever being pivotally mounted on said housing, said float extending at least partially within said vessel;
    a single arm of said first lever, extending opposite from said float, including first magnet means; and
    magnetically controlled means for regulating the supply of said fluid supplied said motor, said regulating means including:
    a further lever, positioned within a first cavity in said housing, isolated from said first lever, also pivotally mounted on said housing, one arm of said further lever including magnetically attracted means, said further lever being so positioned as to be oscillatable as a function of the proximity of said magnetically attractable means to said first magnet means;
    bifurcated passageway means linking both said source with said motor and said source with said first cavity;
    throttling means for regulatably blocking passage of fluid through said passageway linking said source and said first cavity, said throttling means being positioned on another arm of said further lever opposite from said magnetically attracted means, whereby the quantity of said fluid entering said first cavity is incrementally increased or decreased as a function of the proximity of said first magnet means to said magnetically attracted means.

2. The control of claim 1 wherein said throttleing means includes a gasket member provided said another arm of said further lever.

3. The control of claim 1 wherein said bifurcated passageway means are positioned within a pilot portion.

4. The control of claim 1 wherein said magnetically attracted means is a further magnet.

5. The control of claim 1 wherein said one arm of said first lever is oscillatably positioned within a further cavity provided said housing.

6. The control of claim 1 wherein said first cavity includes an exhaust port.

7. The control of claim 6 and including means for causing the quantity of said liquid provided said vessel to be inversely proportional to the quantity of said fluid passing through said exhaust port.

* * * * *